(12) United States Patent
Adachi

(10) Patent No.: US 11,175,543 B2
(45) Date of Patent: Nov. 16, 2021

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/012,462

(22) Filed: Sep. 4, 2020

(65) Prior Publication Data

US 2020/0401001 A1  Dec. 24, 2020

Related U.S. Application Data

(63) Continuation of application No. 16/450,446, filed on Jun. 24, 2019, now Pat. No. 10,768,493, which is a continuation of application No. 15/499,169, filed on Apr. 27, 2017, now Pat. No. 10,379,409.

(30) Foreign Application Priority Data

May 10, 2016 (JP) ................................ 2016-094769

(51) Int. Cl.
*G02F 1/1343* (2006.01)
*G02F 1/1335* (2006.01)
*G02F 1/1333* (2006.01)

(52) U.S. Cl.
CPC .. *G02F 1/134363* (2013.01); *G02F 1/133512* (2013.01); *G02F 1/133354* (2021.01); *G02F 1/134372* (2021.01)

(58) Field of Classification Search
CPC ............................................... G02F 1/134363
See application file for complete search history.

(56) References Cited

U.S. PATENT DOCUMENTS

| 5,721,599 A | 2/1998 | Cheng |
| 2010/0149116 A1 | 6/2010 | Yang et al. |
| 2011/0273647 A1 | 11/2011 | Kim et al. |
| 2012/0057111 A1 | 3/2012 | Ohkubo et al. |
| 2014/0218651 A1 | 8/2014 | Ohkubo et al. |

(Continued)

FOREIGN PATENT DOCUMENTS

| JP | 06-235913 | 8/1994 |
| JP | 2006-243171 A | 9/2006 |
| JP | 2010-204582 A | 9/2010 |

(Continued)

OTHER PUBLICATIONS

Japanese Office Action dated Jan. 21, 2020 in corresponding Japanese Application No. 2016-094769.

*Primary Examiner* — Edmond C Lau
(74) *Attorney, Agent, or Firm* — K&L Gates LLP

(57) ABSTRACT

A display device is provided and includes a first substrate; a translucent coloring layer disposed on the first substrate; a first translucent resin layer disposed on the translucent coloring layer; a light shielding layer disposed on the first translucent resin layer; and a second translucent resin layer disposed on the light shielding layer, wherein the light shielding layer is a matrix of light shielding parts in a display region, a frame region arranged around the display region, a part of the first translucent resin layer in the frame region part is in direct contact with the first substrate, and the part of the first translucent resin layer in the frame region extends along one side of the first substrate.

6 Claims, 7 Drawing Sheets

(56) References Cited

U.S. PATENT DOCUMENTS

2015/0301370 A1\* 10/2015 Moriwaki ............. G02F 1/1345
349/42
2017/0184931 A1\* 6/2017 Zhang ............... G02F 1/136209

FOREIGN PATENT DOCUMENTS

| JP | 2012-058423   | 3/2012  |
|----|---------------|---------|
| JP | 2014-174431 A | 9/2014  |
| JP | 2015-200774 A | 11/2015 |

\* cited by examiner

DISPLAY DEVICE

CROSS-REFERENCE TO RELATED APPLICATIONS

This application is a continuation of U.S. patent application Ser. No. 16/450,446, filed on Jun. 24, 2019, which application is a continuation of U.S. patent application Ser. No. 15/499,169, filed on Apr. 27, 2017, issued as U.S. Pat. No. 10,379,409 on Aug. 13, 2019, which application claims priority from Japanese Application No. 2016-094769, filed on May 10, 2016, the contents of which are incorporated by reference herein in its entirety.

BACKGROUND

1. Technical Field

The present invention relates to a substrate for a display apparatus and a display apparatus.

2. Description of the Related Art

Display apparatuses that achieve higher pixel density (higher definition) have been demanded. Higher pixel density decreases a pixel pitch, which often causes color mixture. Increasing the width of a light shielding layer (black matrix) prevents color mixture, but reduces an aperture ratio, thereby deteriorating luminance.

Arranging the light shielding layer closer to the liquid crystal layer than the color filter reduces a distance between the light shielding layer and the liquid crystal layer. With this configuration, a component included in the light shielding layer may contaminate the liquid crystal layer.

For the foregoing reasons, there is a need for a substrate for a display apparatus and a display apparatus that can prevent color mixture and deterioration in luminance, and can prevent liquid crystals from being contaminated.

SUMMARY

According to an aspect, a substrate for a display apparatus includes: a first substrate; a translucent coloring layer that overlaps with the first substrate; a first translucent resin layer that overlaps with the translucent coloring layer on an opposite side to the first substrate side; a light shielding layer that overlaps with the first translucent resin layer on an opposite side to the first substrate side; and a second translucent resin layer that overlaps with the light shielding layer on an opposite side to the first substrate side. The first translucent resin layer is in contact with the first substrate in at least a part of a frame region arranged around a display region in which light is transmitted through the translucent coloring layer.

According to another aspect, a display apparatus includes: a substrate for a display apparatus that includes a first substrate; a second substrate that overlaps with the first substrate; and a liquid crystal layer arranged between the substrate for a display apparatus and the second substrate. The substrate for a display apparatus further includes: a translucent coloring layer that overlaps with the first substrate; a first translucent resin layer that overlaps with the translucent coloring layer on an opposite side to the first substrate side; a light shielding layer that overlaps with the first translucent resin layer on an opposite side to the first substrate side; and a second translucent resin layer that overlaps with the light shielding layer on an opposite side to the first substrate side. The first translucent resin layer is in contact with the first substrate in at least a part of a frame region arranged around a display region in which light is transmitted through the translucent coloring layer.

DETAILED DESCRIPTION

Figure 1:
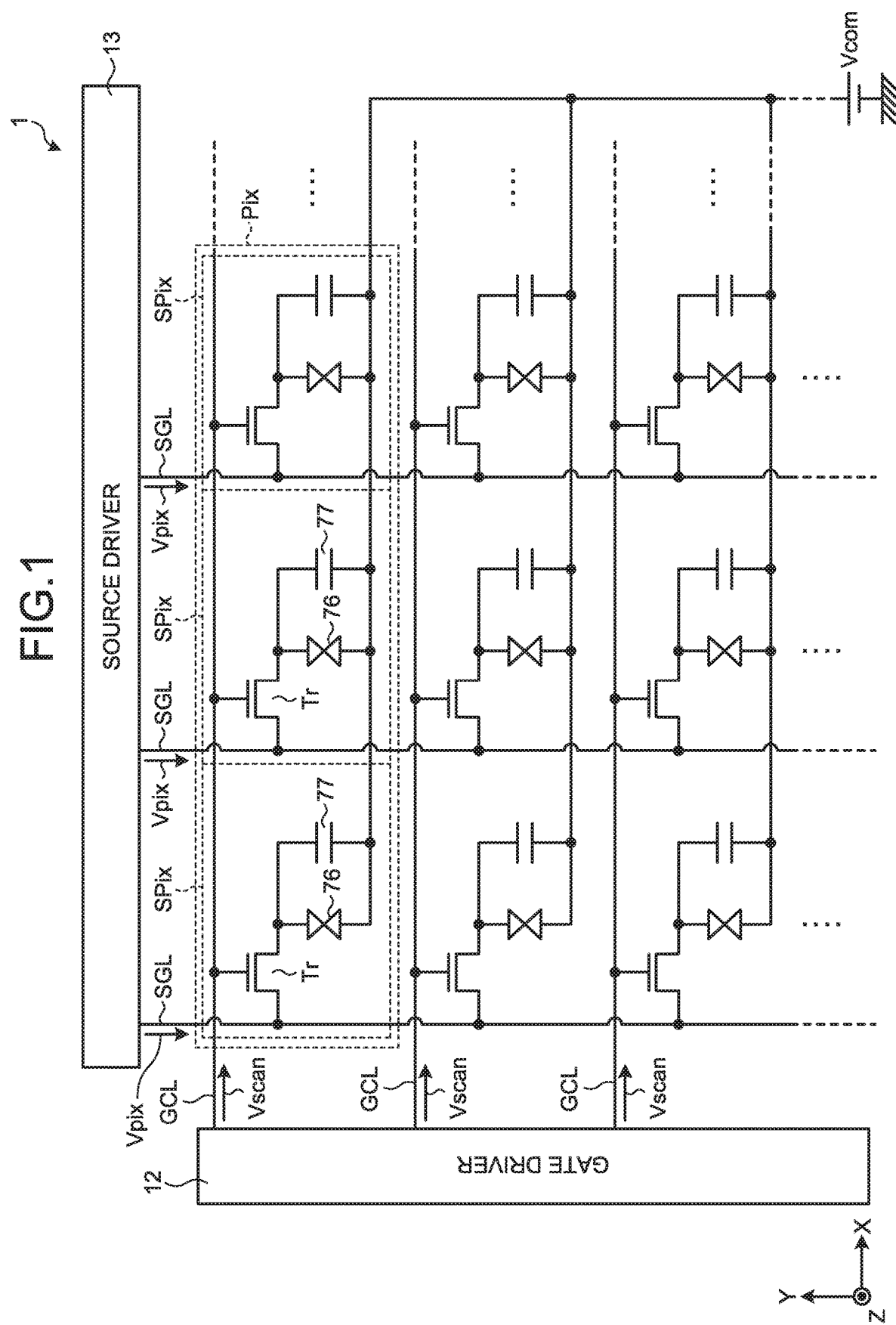
FIG. 1 is a schematic diagram illustrating a display apparatus according to an embodiment.

The following describes an embodiment of the present invention with reference to the drawings. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases. In this disclosure, when an element is described as being "on" another element, the element can be directly on the other element, or there can be one or more elements between the element and the other element.

Figure 2:
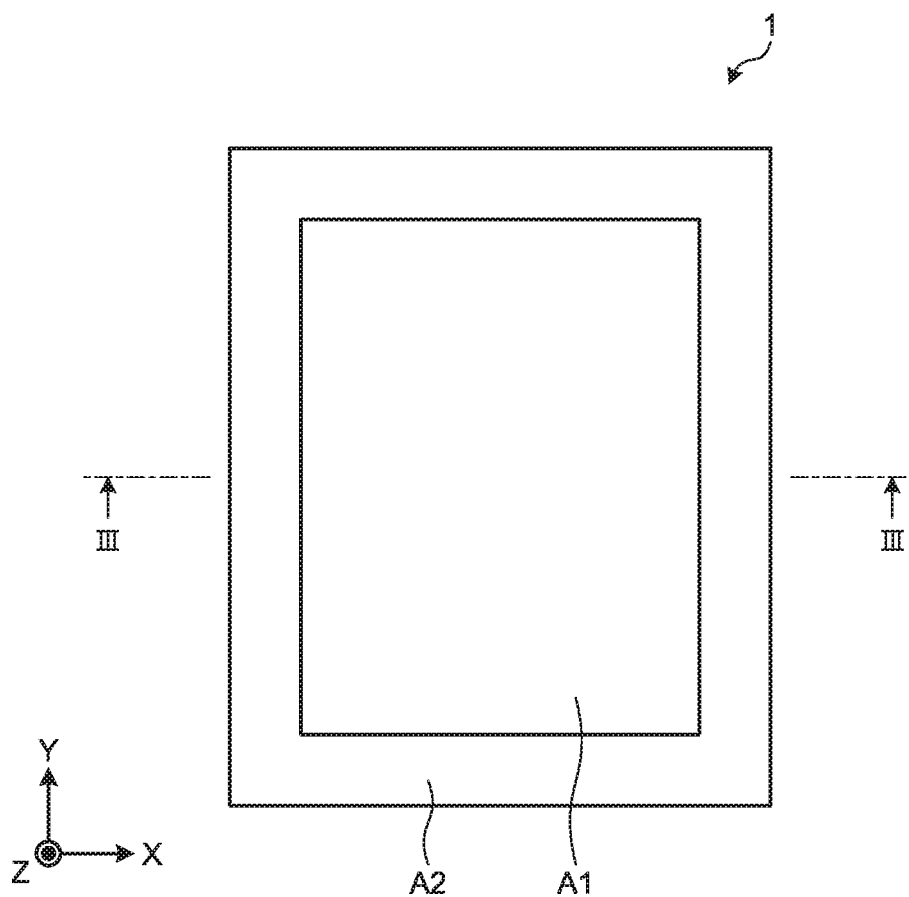
FIG. 2 is a plan view illustrating the display apparatus according to the embodiment.
Figure 3:
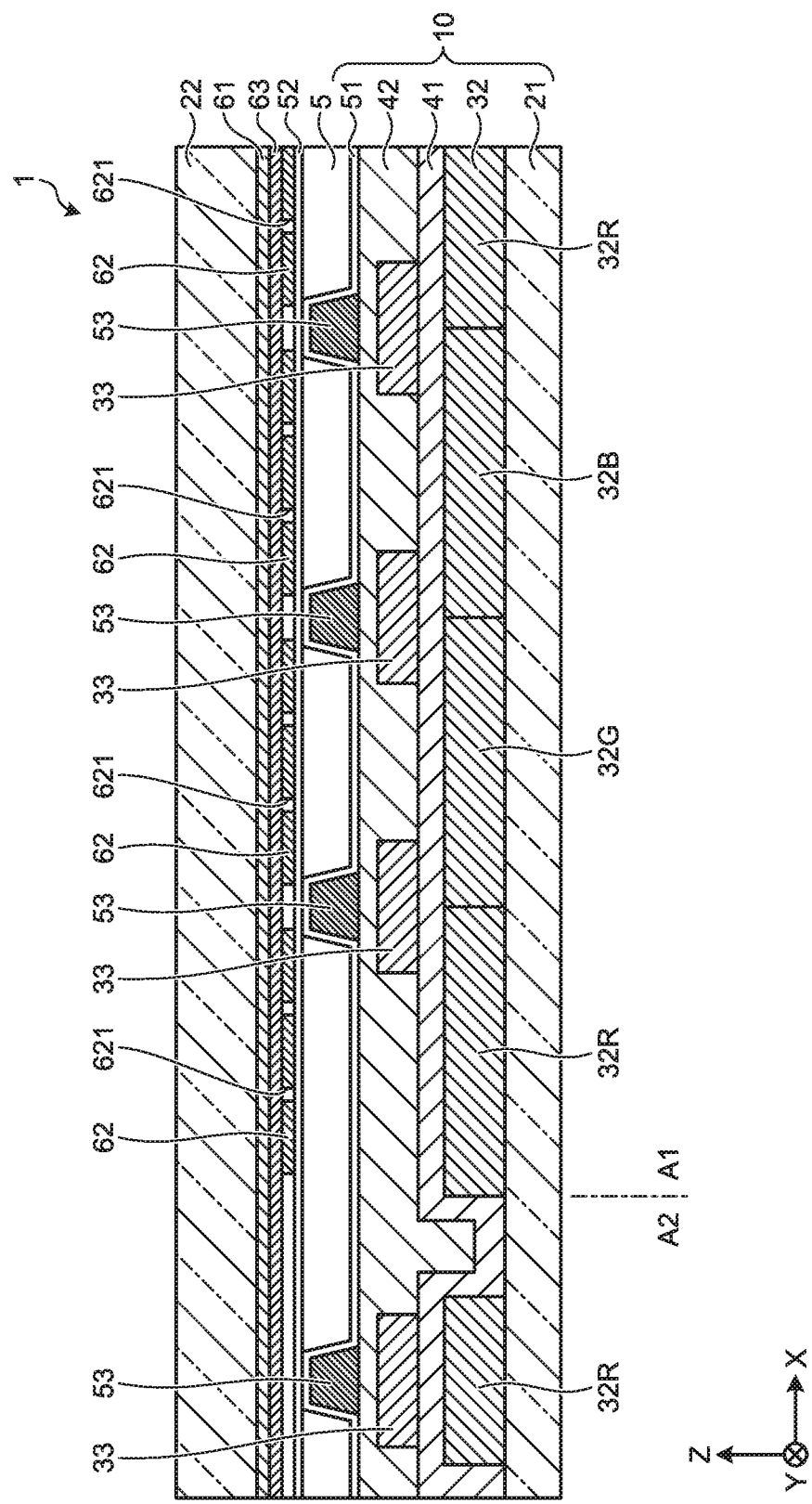
FIG. 3 is a cross-sectional view taken along line III-III in FIG. 2.

FIG. 1 is a schematic diagram illustrating a display apparatus according to the embodiment. FIG. 2 is a plan view illustrating the display apparatus according to the embodiment. FIG. 3 is a cross-sectional view taken along line III-III in FIG. 2. More specifically, FIG. 3 illustrates a cross section obtained by cutting a display apparatus 1 on a plane including middle points of two parallel sides of a rectangular pixel Pix.

The display apparatus 1 is, for example, a liquid crystal display apparatus that can perform color display. The display apparatus 1 is what is called a transmissive liquid crystal display apparatus, for example. As illustrated in FIG. 1, the display apparatus 1 includes a gate driver 12, a source driver 13, a plurality of scanning lines GCL, a plurality of signal lines SGL, and a plurality of pixels Pix. As illustrated in FIG. 3, the display apparatus 1 also includes: a substrate 10 for a display apparatus including a first substrate 21; a second substrate 22; and a liquid crystal layer 5. The substrate 10 for a a display apparatus includes a translucent coloring layer 32, a first translucent resin layer 41, a light shielding layer 33, a spacer 53, and an orientation film 51.

As illustrated in FIG. 1, the scanning lines GCL are arranged on a plane parallel with the first substrate 21. The scanning lines GCL are coupled to the gate driver 12. The signal lines SGL are arranged on a plane parallel with the first substrate 21. The signal lines SGL are coupled to the source driver 13. The signal lines SGL are, for example, orthogonal to the scanning lines GCL. In the following description, used is an XYZ orthogonal coordinate system including the X-axis parallel with the scanning lines GCL, the Y-axis parallel with the signal lines SGL, and the Z-axis orthogonal to the X-axis and the Y-axis.

As illustrated in FIG. 2, the display apparatus 1 includes a display region A1 and a frame region A2. The display region A1 is a region in which light is transmitted through the translucent coloring layer 32, and has a rectangular shape, for example. The display region A1 is also a region in which an image is displayed by pixels Pix. The frame region A2 is a belt-shaped region surrounding the display region A1.

A plurality of pixels Pix are arranged in a matrix in the display region A1 illustrated in FIG. 2. Each pixel Pix includes a plurality of sub-pixels SPix. The number of the sub-pixels SPix included in the pixel Pix is, for example, three. The sub-pixel SPix includes a switching element Tr, a liquid crystal capacitor 76, and a holding capacitor 77. The switching element Tr is, for example, a thin film transistor (TFT). The source of the switching element Tr is coupled to the signal line SGL. The gate of the switching element Tr is coupled to the scanning line GCL. The drain of the switching element Tr is coupled to one end of the liquid crystal capacitor 76 and one end of the holding capacitor 77.

The liquid crystal capacitor 76 indicates a capacity component generated between a counter electrode 61 and a pixel electrode 62. One end of the liquid crystal capacitor 76 is coupled to the drain of the switching element Tr, and a common potential Vcom is supplied to the other end of the liquid crystal capacitor 76. One end of the holding capacitor 77 is coupled to the drain of the switching element Tr, and the common potential Vcom is supplied to the other end of the holding capacitor 77. The holding capacitor 77 is a capacity component for holding a voltage for image display applied between the counter electrode 61 and the pixel electrode 62.

The sub-pixel SPix is coupled to the other sub-pixels SPix belonging to the same row via the scanning line GCL. The gate driver 12 supplies a scanning signal Vscan (refer to FIG. 1) to the switching element Tr via the scanning line GCL. The sub-pixel SPix is coupled to the other sub-pixels SPix belonging to the same column via the signal line SGL. The source driver 13 supplies a pixel signal Vpix (refer to FIG. 1) to the pixel electrode 62 via the signal line SGL.

The gate driver 12 sequentially scans and drives the scanning lines GCL. The gate driver 12 applies the scanning signal Vscan to the gate of the switching element Tr of the sub-pixel SPix via the scanning line GCL to sequentially select one row (one horizontal line) of the sub-pixels SPix as a display driving target. The source driver 13 supplies the pixel signal Vpix to the sub-pixels SPix included in the selected one horizontal line via the signal line SGL. Display is performed in the sub-pixels Spix for each horizontal line in accordance with the supplied pixel signal Vpix.

Figure 4:
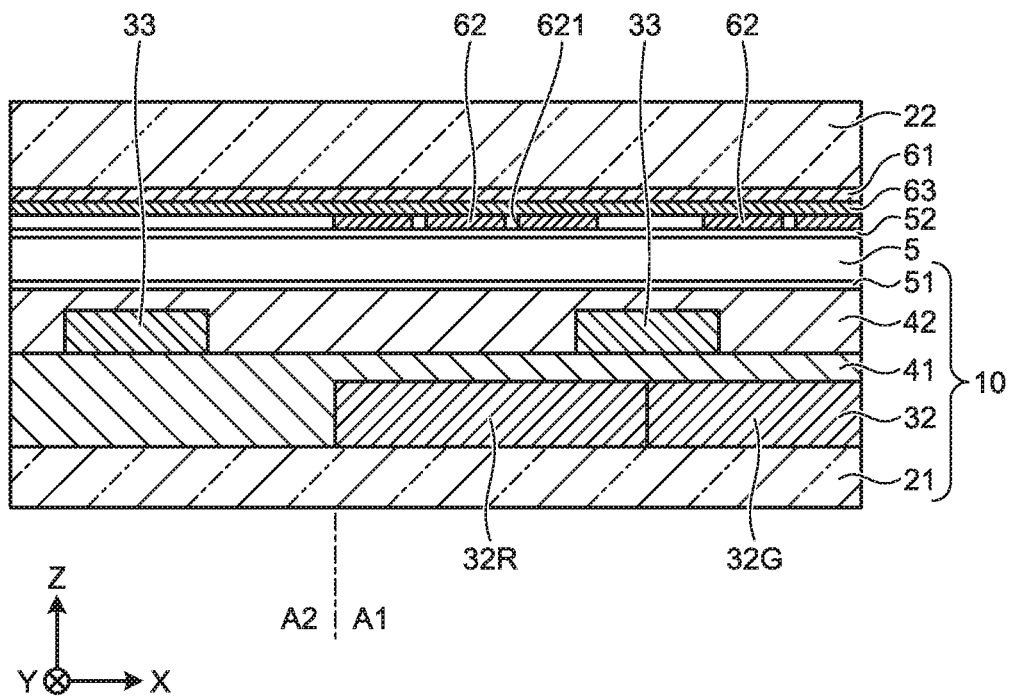
FIG. 4 is a cross-sectional view illustrating a cross section at a different position from that of the III-III cross section of FIG. 2.
Figure 5:
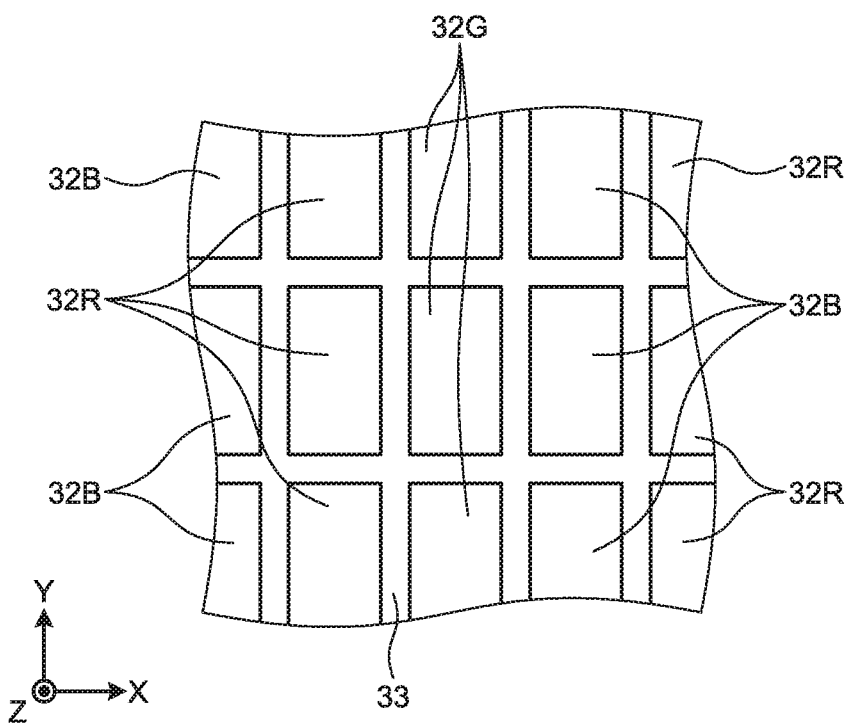
FIG. 5 is a plan view illustrating a display region of the display apparatus according to the embodiment in an enlarged manner.
Figure 6:
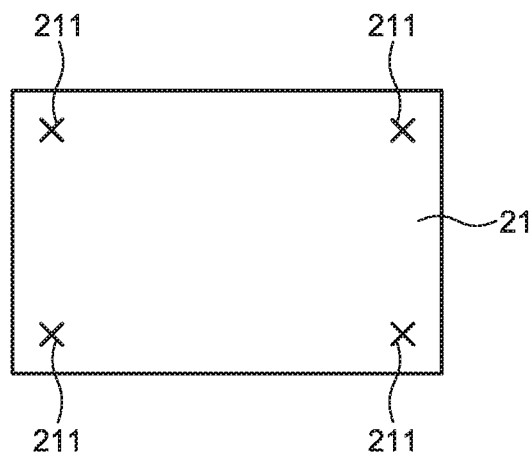
FIG. 6 is a plan view illustrating an alignment mark formed at the time of manufacturing the display apparatus according to the embodiment.

FIG. 4 is a cross-sectional view illustrating a cross-section at a different position from that of the III-III cross-section of FIG. 2. More specifically, FIG. 4 illustrates a cross section obtained by cutting the display apparatus 1 on a plane including one side of the rectangular pixel Pix. In other words, FIG. 4 illustrates a cross section obtained by cutting the display apparatus 1 on a plane parallel with the III-III cross section at a position where the spacer 53 is not included. FIG. 5 is a plan view illustrating the display region of the display apparatus according to the embodiment in an enlarged manner. FIG. 6 is a plan view illustrating an alignment mark formed at the time of manufacturing the display apparatus according to the embodiment.

The first substrate 21 is a substrate made of glass, for example. The translucent coloring layer 32 is a coloring layer including a plurality of color regions (a color region 32R, a color region 32G, and a color region 32B). The translucent coloring layer 32 overlaps with one surface of the first substrate 21. The color region 32R is a red region, the color region 32G is a green region, and the color region 32B is a blue region. As illustrated in FIG. 5, the color regions are arranged in a matrix. For example, the color region 32R, the color region 32G, and the color region 32B are sequentially arranged in the X-direction, and the same color regions are arranged in the Y-direction. That is, a column of color regions 32R arranged in the Y-direction, a column of color regions 32G arranged in the Y-direction, and a column of color regions 32B arranged in the Y-direction are sequentially arranged in the X-direction. In the following description, a direction in which the translucent coloring layer 32 is provided when viewed from the first substrate 21 is represented as +Z-direction.

As illustrated in FIG. 3, the translucent coloring layer 32 is formed on the first substrate 21 in a part of the frame region A2. The translucent coloring layer 32 arranged in the frame region A2 is positioned so as to overlap with the spacer 53 arranged in the frame region A2, and supports the spacer 53. On the other hand, as illustrated in FIG. 4, the translucent coloring layer 32 is not arranged in a part of the frame region A2 not overlapping with the spacer 53.

The translucent coloring layer 32 is manufactured using a photolithography method, for example. First, for example, a blue color resist is applied to the first substrate 21, and the first substrate 21 is caused to spin. After the color resist is dried under reduced pressure, the color resist is irradiated with ultraviolet rays via a mask. Thereafter, the color resist is rinsed to remove an excess portion, and the color resist remaining on the first substrate 21 is cured by baking. The process described above from the application of the color resist to the baking of the color resist is repeated using a red color resist and a green color resist. This process allows the translucent coloring layer 32 including the color region 32R, the color region 32G, and the color region 32B to be formed on the first substrate 21.

Alignment marks 211 on the first substrate 21 illustrated in FIG. 6 are formed with a blue color resist. That is, the alignment marks 211 are formed in a process of forming the color region 32B on the first substrate 21. The alignment mark 211 is a mark used for positioning the display apparatus 1 in a manufacturing process of the display apparatus 1. This eliminates one of the manufacturing processes of the display apparatus 1 in comparison with formation of the alignment mark with a black color resist (black matrix) as in the related art, and thus improves manufacturing efficiency of the display apparatus 1.

The first translucent resin layer 41 is a transparent layer made of a resin, more specifically, an insulating resin. That is, the first translucent resin layer 41 is a transparent insulating member. The first translucent resin layer 41 overlaps with the translucent coloring layer 32 in the +Z-direction.

The area of the first translucent resin layer 41 is identical to the area of the first substrate 21 when viewed in the Z-direction, for example. As illustrated in FIGS. 3 and 4, the first translucent resin layer 41 is in contact with the first substrate 21 in at least part of the frame region A2. The first translucent resin layer 41 is made of, for example, a photo-curable resin, which is applied to the translucent coloring layer 32 and irradiated with ultraviolet rays to be cured.

The light shielding layer 33 is what is called a black matrix. The light shielding layer 33 overlaps with the first translucent resin layer 41 in the +Z-direction. Forming the light shielding layer 33 on the surface of the translucent coloring layer 32 may often cause variations in shape of the light shielding layer 33 depending on dimensional accuracy of the translucent coloring layer 32. In contrast, forming the light shielding layer 33 on a flat surface of the first translucent resin layer 41 prevents variations in shape of the light shielding layer 33. As illustrated in FIG. 5, the light shielding layer 33 is arranged in a grid-like manner. Specifically, the light shielding layer 33 overlaps with boundaries between adjacent color regions (a boundary between the color region 32R and the color region 32G adjacent to each other, a boundary between the color region 32G and the color region 32B adjacent to each other, a boundary between the color region 32B and the color region 32R adjacent to each other, a boundary between adjacent two color regions 32R, a boundary between adjacent two color regions 32G, and a boundary between adjacent two color regions 32B). The light shielding layer 33 is a single layer, for example. That is, one light shielding layer 33 overlaps with the first substrate 21 both in the display region A1 and the frame region A2, when viewed in the Z-direction.

A second translucent resin layer 42 is a transparent layer made of a resin, more specifically an insulating resin. That is, the second translucent resin layer 42 is a transparent insulating member. The second translucent resin layer 42 overlaps with the light shielding layer 33 in the +Z-direction. For example, the area of the second translucent resin layer 42 is identical to the area of the first substrate 21 when viewed in the Z-direction. The second translucent resin layer 42 is, for example, a photo-curable resin, which is applied to the first translucent resin layer 41 and the light shielding layer 33 and irradiated with ultraviolet rays to be cured.

The spacer 53 is a member for maintaining the thickness (cell gap) of the liquid crystal layer 5. The spacer 53 overlaps with the second translucent resin layer 42 in the +Z-direction. The spacer 53 also overlaps with the light shielding layer 33. The spacer 53 is preferably arranged at a crossing portion of the grid-like light shielding layer 33. As illustrated in FIG. 3, the width of the spacer 53 in the X-direction is smaller than the width of the light shielding layer 33. Similarly, the width of the spacer 53 in the Y-direction is smaller than the width of the light shielding layer 33 in the Y-direction.

The orientation film 51 is a film for orienting liquid crystal molecules of the liquid crystal layer 5 in a predetermined direction. The orientation film 51 overlaps with the second translucent resin layer 42 in the +Z-direction.

The second substrate 22 is a substrate made of glass, for example, and is parallel with the first substrate 21. The counter electrode 61, an insulating film 63, and a plurality of pixel electrodes 62 are formed on the second substrate 22. The counter electrode 61 is, for example, a transparent electrode. Specifically, the counter electrode 61 is, for example, indium tin oxide (ITO). The counter electrode 61 overlaps with the second substrate 22 in the −Z-direction. For example, the counter electrode 61 is formed on the surface of the second substrate 22 using a sputtering method. The insulating film 63 overlaps with the counter electrode 61 in the −Z-direction. The pixel electrode 62 is, for example, ITO. The pixel electrode 62 is formed on the surface of the insulating film 63 using the sputtering method, for example. The pixel electrode 62 is insulated from the counter electrode 61 by the insulating film 63. The pixel electrodes 62 are arranged in a matrix. One pixel electrode 62 corresponds to one sub-pixel SPix. One pixel electrode 62 includes a plurality of slits 621. An electric field generated between the counter electrode 61 and the pixel electrode 62 acts on the liquid crystal layer 5 via the slit 621. An orientation film 52 is arranged on the pixel electrode 62 in the −Z-direction. For example, a backlight is arranged on the second substrate 22 in the +Z-direction. Light from the backlight sequentially passes through the second substrate 22, the liquid crystal layer 5, and the substrate 10 for a display apparatus, and is emitted toward the first substrate 21 in the −Z-direction.

The liquid crystal layer 5 can change light transmittance in accordance with the state of an electric field. The display apparatus 1 is a display apparatus of a fringe field switching (FFS) system, for example. The electric field of the liquid crystal layer 5 is changed by the counter electrode 61 and the pixel electrode 62.

The display apparatus 1 is not necessarily the display apparatus of the FFS system. For example, the display apparatus 1 may be a display apparatus of a twisted nematic (TN) system, a vertical alignment (VA) system, or an in plane switching (IPS) system. The display apparatus 1 may also be a reflective liquid crystal display apparatus. When the display apparatus 1 is a reflective liquid crystal display apparatus, the display apparatus 1 has a reflective electrode that reflects light as the pixel electrode 62 instead of the transparent electrode, or has a reflective plate and the like on the second substrate 22 in the +Z-direction.

The number of colors of the color regions included in the translucent coloring layer 32 is not limited to three, and may be any number as long as it is plural. For example, the translucent coloring layer 32 may include a white color region in addition to the color region 32R, the color region 32G, and the color region 32B.

The first translucent resin layer 41 and the second translucent resin layer 42 may not be completely transparent as long as they have translucency. It is preferable that change in color of light transmitted through the translucent coloring layer 32 which is caused by the first translucent resin layer 41 and the second translucent resin layer 42 is as little as possible. Thus, the first translucent resin layer 41 and the second translucent resin layer 42 are preferably close to transparent as much as possible.

As described above, the substrate 10 for a display apparatus includes: the first substrate 21; the translucent coloring layer 32 that overlaps with the first substrate 21; the first translucent resin layer 41 that overlaps with the translucent coloring layer 32 on the opposite side (in the +Z-direction) to the first substrate 21 side; the light shielding layer 33 that overlaps with the first translucent resin layer 41 on the opposite side (in the +Z-direction) to the first substrate 21 side; and the second translucent resin layer 42 that overlaps with the light shielding layer 33 on the opposite side (in the +Z-direction) to the first substrate 21 side. Arranging the light shielding layer 33 closer to the liquid crystal layer 5 than the translucent coloring layer 32 prevents color mixture. The color mixture is a phenomenon in which light transmitted through adjacent color regions having different colors enters the eyes of a person when the person views the display region A1 in an oblique direction (a direction forming an angle to the Z-axis).

The above configuration widens the path of the light (optical path) that passes through the translucent coloring layer 32 in an oblique direction (direction forming an angle to the Z-axis), thereby improving luminance when the display apparatus 1 is viewed in the oblique direction. Arranging the second translucent resin layer 42 between the light shielding layer 33 and the liquid crystal layer 5 prevents the liquid crystal layer 5 from being contaminated by the light shielding layer 33. The substrate 10 for a display apparatus and the display apparatus 1 thus can prevent color mixture and deterioration in luminance, as well as being capable of preventing contamination of liquid crystals. The orientation film 51 is very thin in comparison to the light shielding layer 33, and thus only with the orientation film 51, it is difficult to prevent contamination of the liquid crystal layer 5 by the light shielding layer 33.

In the substrate 10 for a display apparatus, the light shielding layer 33 is formed on the surface of the first translucent resin layer 41 instead of the surface of the translucent coloring layer 32. This prevents variations in shape of the light shielding layer 33, thereby allowing the light shielding layer 33 to be easily narrowed. The aperture ratio of the substrate 10 for a display apparatus thus improves, thereby improving transmittance (a ratio of emitted light quantity to incident light quantity) in the display apparatus 1.

First Modification

Figure 7:
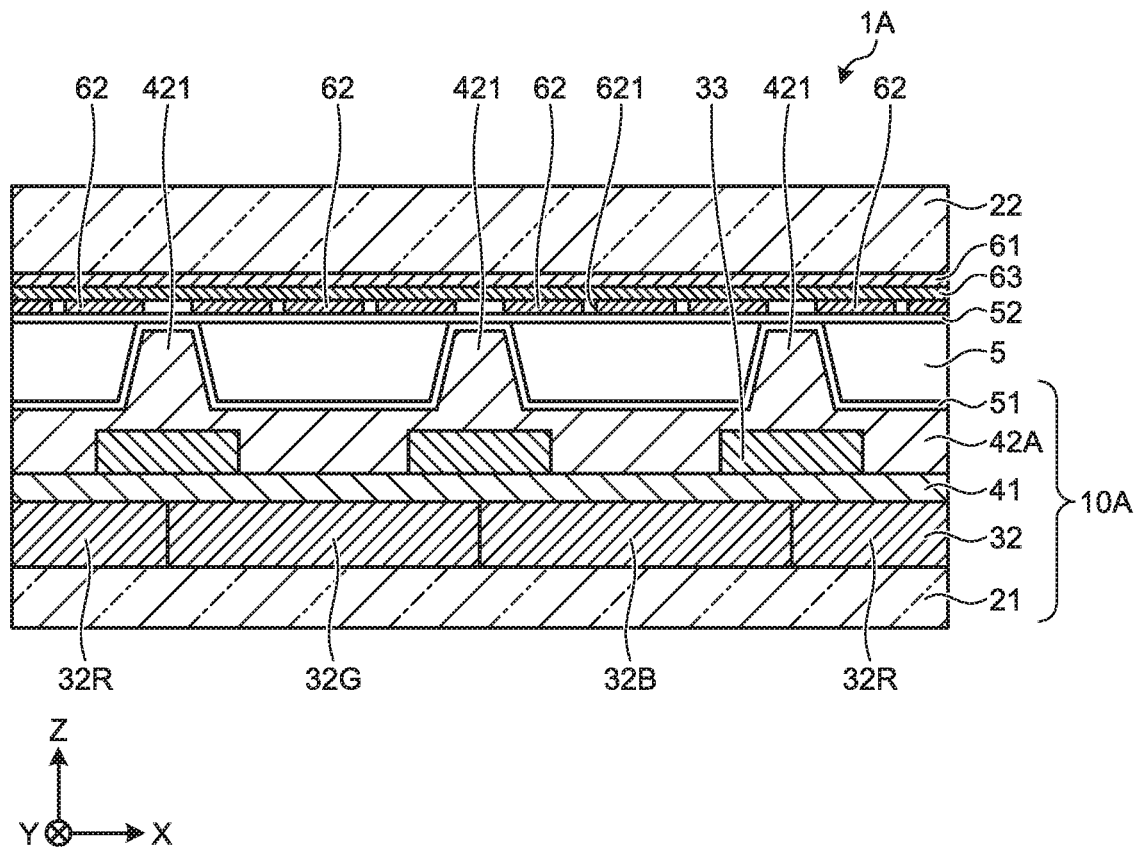
FIG. 7 is a cross-sectional view of a display apparatus according to a first modification of the embodiment.

FIG. 7 is a cross-sectional view of a display apparatus according to a first modification of the embodiment. More specifically, FIG. 7 illustrates a cross section obtained by cutting a display apparatus 1A according to the first modification on a plane including middle points of two parallel sides of the rectangular pixel Pix. A substrate 10A for a display device according to the first modification includes a second translucent resin layer 42A different from the second translucent resin layer 42 described above, and a spacer 421 different from the spacer 53 described above.

The second translucent resin layer 42A is a transparent layer made of a resin. The second translucent resin layer 42A overlaps with the light shielding layer 33 in the +Z-direction. For example, the area of the second translucent resin layer 42A is identical to the area of the first substrate 21 when viewed in the Z-direction. The second translucent resin layer 42A is, for example, a photo-curable resin, which is applied to the first translucent resin layer 41 and the light shielding layer 33 and irradiated with ultraviolet rays to be cured.

The spacer 421 is a member for maintaining the thickness (cell gap) of the liquid crystal layer 5. As illustrated in FIG. 7, the spacer 421 is made of the same material of that of the second translucent resin layer 42A, and is formed integrally with the second translucent resin layer 42A. For example, the spacer 421 is formed by half exposure. That is, a portion of the second translucent resin layer 42A excluding the spacer 421 is irradiated with a reduced amount of ultraviolet rays. Removing a non-cured portion from the second translucent resin layer 42A forms the spacer 421. Manufacturing the spacer 421 and the second translucent resin layer 42A in the same process improves manufacturing efficiency.

Second Modification

Figure 8:
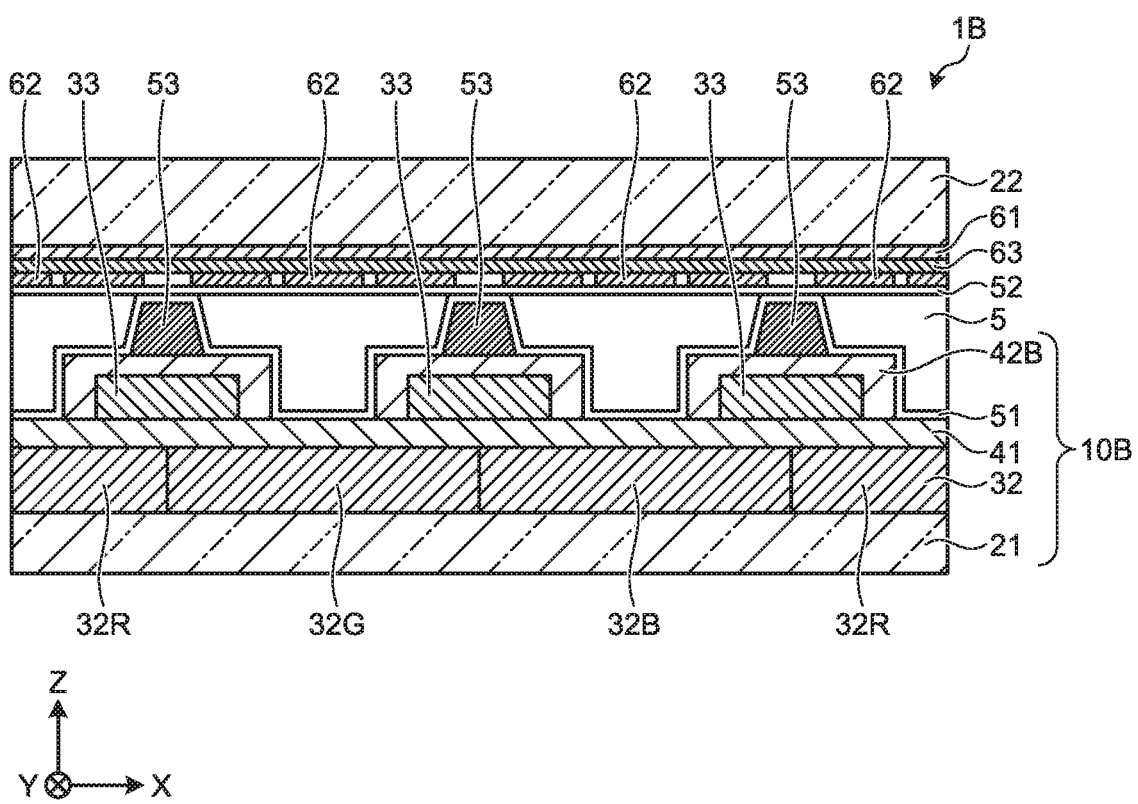
FIG. 8 is a cross-sectional view of a display apparatus according to a second modification of the embodiment.

FIG. 8 is a cross-sectional view of the display device according to a second modification of the embodiment. More specifically, FIG. 8 illustrates a cross section obtained by cutting a display device 1B according to the second modification on a plane including middle points of two parallel sides of the rectangular pixel Pix. The substrate 10B for a display device according to the second modification includes a second translucent resin layer 42B different from the second translucent resin layer 42 described above.

The second translucent resin layer 42B is a transparent layer made of a resin. The second translucent resin layer 42B overlaps with the light shielding layer 33 in the +Z-direction. The area of the second translucent resin layer 42B is different from the area of the first substrate 21 when viewed in the Z-direction. That is, the second translucent resin layer 42B overlaps with the light shielding layer 33, while not overlapping with a part of the first translucent resin layer 41, as illustrated in FIG. 8. This configuration reduces an amount of the resin to be used in comparison to the embodiment described above. The second translucent resin layer 42B is made of, for example, a photo-curable resin, which is applied to the light shielding layer 33 and irradiated with ultraviolet rays to be cured.

Specifically, the second translucent resin layer 42B is arranged in a grid-like manner similarly to the light shielding layer 33. The second translucent resin layer 42B is arranged only at a position where the light shielding layer 33 is arranged, and covers a part of the surface of the light shielding layer 33 that is not in contact with the first translucent resin layer 41. The second modification is the same as the first modification in that the light shielding layer 33 is interposed between the first translucent resin layer 41 and the second translucent resin layer 42B to be protected, and is different from the first modification in that the second translucent resin layer 42B is not arranged on the entire surface of the first substrate 21. As illustrated in FIG. 8, the width of the second translucent resin layer 42B in the X-direction is larger than the width of the light shielding layer 33. The same applies to widths in the Y-direction. This configuration allows the second translucent resin layer 42B to cover the light shielding layer 33, thereby preventing the liquid crystal layer 5 from being contaminated by the light shielding layer 33. The spacer 53 is arranged at a position to overlap with the light shielding layer 33 when viewed in the Z-direction. The second translucent resin layer 42B and the spacer 53 may be made of the same resin material. In this case, the spacer 53 is formed after the second translucent resin layer 42B is formed.

As illustrated in FIG. 8, a gap between adjacent light shielding layers 33 is not filled with the second translucent resin layer 42B on a cross section vertical to the first substrate 21. Accordingly, the orientation film 51 and the liquid crystal layer 5 are partially arranged between adjacent light shielding layers 33.

Third Modification

Figure 9:
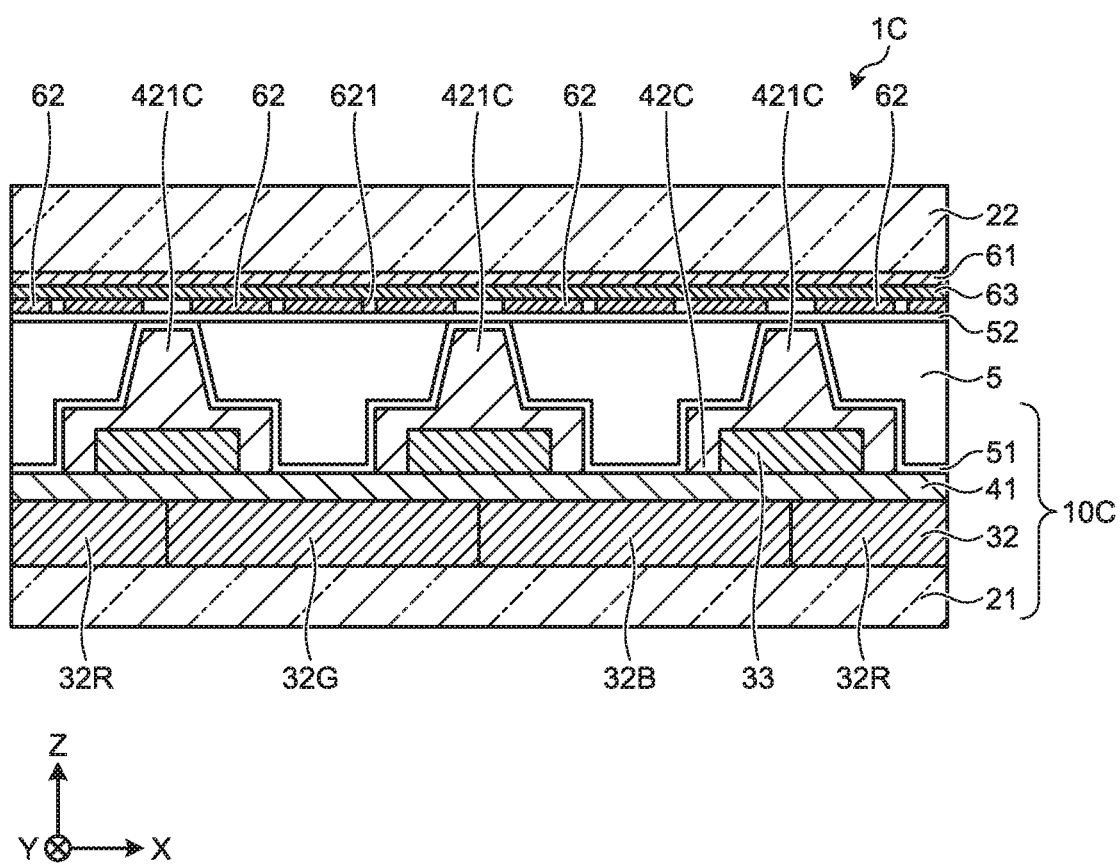
FIG. 9 is a cross-sectional view of a display apparatus according to a third modification of the embodiment.

FIG. 9 is a cross-sectional view of the display device according to a third modification of the embodiment. More specifically, FIG. 9 illustrates a cross section obtained by cutting a display device 1C according to the third modification on a plane including middle points of two parallel sides of the rectangular pixel Pix. A substrate 10C for a display device according to the third modification includes a second translucent resin layer 42C different from the second translucent resin layer 42 described above, and a spacer 421C different from the spacer 53 described above.

The second translucent resin layer 42C is a transparent layer made of a resin. The second translucent resin layer 42C overlaps with the light shielding layer 33 in the +Z-direction. The area of the second translucent resin layer 42C is smaller than the area of the first substrate 21 when viewed in the Z-direction. That is, the second translucent resin layer 42C overlaps with the light shielding layer 33, while not overlapping with a part of the first translucent resin layer 41, as illustrated in FIG. 9. This configuration reduces an amount of the resin to be used in comparison to the embodiment described above. The second translucent resin layer 42C is, for example, a photo-curable resin, which is applied to the light shielding layer 33 and irradiated with ultraviolet rays to be cured.

Specifically, the second translucent resin layer 42C is arranged in a grid-like manner similarly to the light shielding layer 33. As illustrated in FIG. 9, the width of the second translucent resin layer 42C in the X-direction is larger than the width of the light shielding layer 33. The same applies to widths in the Y-direction. This configuration allows the second translucent resin layer 42C to cover the light shielding layer 33, thereby preventing the liquid crystal layer 5 from being contaminated by the light shielding layer 33.

As illustrated in FIG. 9, a gap between adjacent light shielding layers 33 is not filled with the second translucent resin layer 42C on a cross section vertical to the first substrate 21. Accordingly, the orientation film 51 and the liquid crystal layer 5 are partially arranged between adjacent light shielding layers 33.

The spacer 421C is a member for maintaining the thickness (cell gap) of the liquid crystal layer 5. As illustrated in FIG. 9, the spacer 421C is made of the same material as that of the second translucent resin layer 42C, and is formed integrally with the second translucent resin layer 42C. For example, the spacer 421C is formed by half exposure. That is, a portion of the second translucent resin layer 42C excluding the spacer 421C is irradiated with a reduced amount of ultraviolet rays. Removing a non-cured portion from the second translucent resin layer 42C forms the spacer 421C. Manufacturing the spacer 421C and the second translucent resin layer 42C in the same process improves manufacturing efficiency.

The present invention can naturally provide other advantageous effects that are provided by the aspects described in the embodiment above and are clearly defined by the description in the present specification or appropriately conceivable by those skilled in the art.

What is claimed is:

1. A display device comprising:
   a first substrate;
   a translucent coloring layer disposed on the first substrate;
   a first translucent resin layer disposed on the translucent coloring layer;
   a light shielding layer disposed on the first translucent resin layer; and
   a second translucent resin layer disposed on the light shielding layer,
   wherein
   the light shielding layer is a matrix of light shielding parts in a display region,
   a frame region arranged around the display region,
   a part of the first translucent resin layer in the frame region part is in direct contact with the first substrate, and
   the part of the first translucent resin layer in the frame region extends along one side of the first substrate.

2. The display device according to claim 1, further comprising:
   a spacer that is disposed to overlap the light shielding layer when viewed in a first direction perpendicular to the first substrate.

3. The display device according to claim 2, wherein the spacer is made of a material identical to that of the second translucent resin layer.

4. The display device according to claim 3, wherein the spacer is integrated with the second translucent resin layer.

5. The display device according to claim 1, wherein the light shielding layer is a single layer when viewed in a first direction perpendicular to the first substrate.

6. The display device according to claim 1, wherein
   the first translucent resin layer overlaps an entire area of the translucent coloring layer and an entire area of the light shielding layer, when viewed in a first direction perpendicular to the first substrate.

* * * * *